Feb. 7, 1956　　　　　N. T. STARR　　　　　2,733,820
REFUSE TRUCK

Filed Sept. 7, 1951　　　　　　　　　　　　5 Sheets-Sheet 1

INVENTOR.
Norbert T. Starr.
BY
Harness, Dickey & Pierce
ATTORNEYS.

United States Patent Office 2,733,820
Patented Feb. 7, 1956

2,733,820

REFUSE TRUCK

Norbert T. Starr, Detroit, Mich., assignor to Gar Wood Industries, Inc., Wayne, Mich., a corporation of Michigan Application September 7, 1951, Serial No. 245,469

31 Claims. (Cl. 214—83.3)

This invention relates to refuse carrying vehicles, and more particularly to vehicles having self loading means whereby refuse or similar loose material may be systematically loaded into one end portion of the body, moved or compressed into the body by power actuated means and later dumped from the body.

In the past, self loading vehicles of the type described have been proposed, wherein a loading hopper is provided at the lower portion of the tail gate, and a compressing panel pivotally mounted on the tail gate alternately compresses the refuse into the truck and is retracted to allow another load to fill the hopper. A vehicle of this type is shown in Patent No. 2,212,058 to George B. Wood, issued August 20, 1940, in which the compressing panel cooperates with a retaining panel which holds the refuse in its compressed position upon retracting movement of the compressing panel. The assembly is further provided with a loading door mounted in the compressing panel which is opened to feed the refuse into the hopper, after which the door is closed and the hopper moved to its compressing position.

It is an object of the present invention to overcome several of the disadvantages present in a refuse compressing vehicle of the type shown in the aforesaid patent, and to provide a more efficient structure which is at the same time more economical to manufacture and combines important safety features with the above described operational characteristics.

It is another object to provide a self loading vehicle of the above character, in which the pivoting compressing panel also serves as a loading door, thereby eliminating the necessity for a separate loading door mounted in the assembly. In association with this object, it is within the contemplation of this invention to provide a unit wherein the actuating means for the compressing panel permits a relatively large angular movement of this panel, thereby enabling it to serve as both a ram and a loading door.

It is also an object to provide a self loading vehicle in which the compressing panel can be closed without effort on the part of the operator, but which embodies means for insuring a non-powered closing movement, thus obviating the danger of injury to the operator when the panel enters the hopper.

It is another object to provide a self loading vehicle of the above character, which embodies novel and improved actuating means for the compressing panel. In particular, it is an object to provide an arrangement wherein the compressing panel is reciprocated by power means, this means having a greater mechanical advantage when the compressing panel is moved toward its compressing position than when the panel is retracted, thus giving a more efficient operating cycle.

It is a further object to provide a refuse compressing vehicle in which the retaining panel is automatically locked in its retaining position by hydrostatic means when the compressing panel starts its retracting stroke, thus insuring the retention of all the refuse. In association with this object, it is within the contemplation of the invention to provide a refuse compressor having a retaining panel which is automatically locked when the compressing panel is retracted, no matter what position the retaining panel is in, so that the retaining panel will function with full efficiency even when the compressing pressure is relatively high.

It is another object to provide a refuse compressor having a retaining panel of the above character, which is returned to its retracted position by hydraulic means, this means also serving to hydraulically lock the retaining panel in its retaining position.

Other objects, features, and advantages of the present invention will become aparent from the subsequent description, taken in conjunction with the accompanying drawings.

*Tail gate and panels*

The invention comprises a tail gate generally indicated at 21 which is pivotally mounted at 22 to the upper rear end of a truck body, 23, such as a dump body of the type used to collect refuse. The tail gate comprises oppositely disposed side walls 24 having strengthening ribs or channels 25, with an arcuate shaped chute or hopper 26 formed at the lower wide end portion of the tail gate. As seen best in Figure 3, the tail gate is provided further with a pair of side flanges 27 which serve as lips to overlap the open rear end of the truck. Pivotally mounted between the side walls 24 is a ram or compressing panel generally indicated at 28 and an auxiliary or retaining panel 29. The tail gate is provided further with a deflector panel 30, having strengthening ribs 31, which extends transversely across the forward end of the tail gate at the upper portion thereof and is supported by upper, intermediate and lower cross pieces 32. Extensions 33 at the opposite ends of this deflector panel are provided with pivotal connections to which may be connected one or more power actuators 34 for lifting the tail gate about pivots 22 when the refuse is to be dumped. The actuating linkage and power means for the compressing and retaining panels are preferably protected by an upper shield 35 of rectangular shape which is pivotally mounted by means 36 at its upper edge to the tail gate and extends across the rear of the tail gate. A shield 37 is secured to and extends transversely across the compressing panel linkage, hereinafter described, shield 37 being disposed above the compressing panel 28 and being adapted to slide partially under shield 35 when the compressing panel is retracted.

Figures 6, 7:
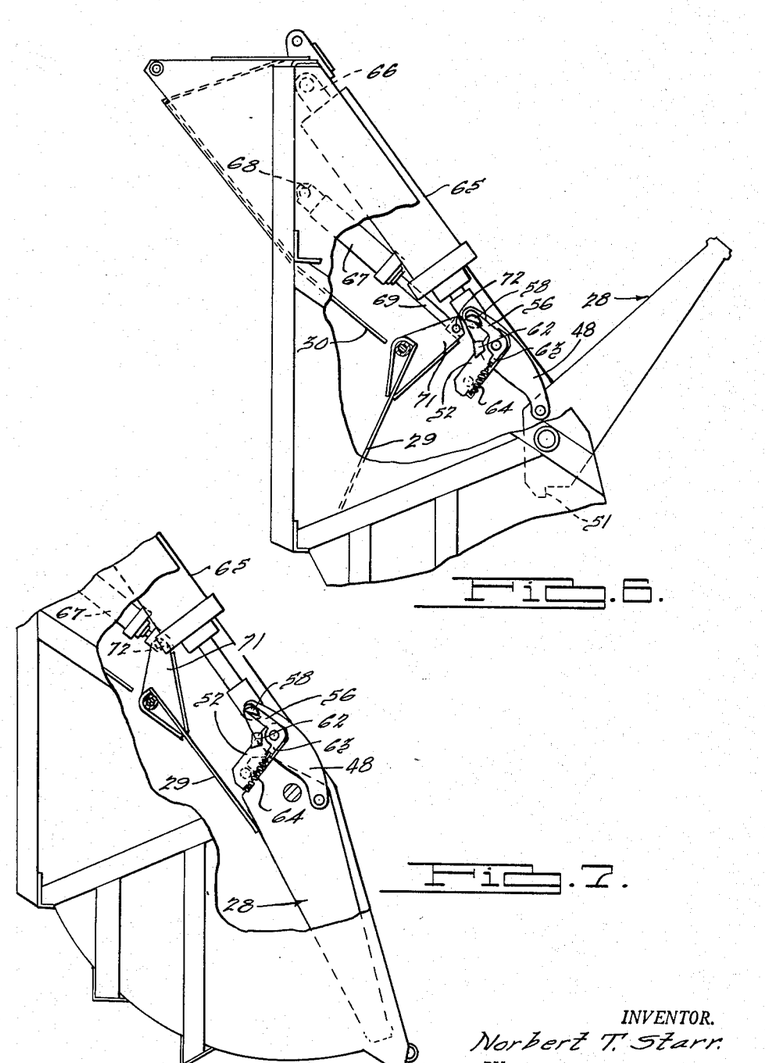
Figure 6 is a schematic view of the assembly, with the compressing panel in retracted position and the retaining panel in retaining position.
Figure 7 is a view similar to Figure 6 but showing the compressing panel in its closed position and the retaining panel in retracted position.

The compressing of panel 28 and retaining panel 29 are both pivotally secured between the side walls 24, and in particular the retaining panel pivots are disposed forwardly and upwardly from the compressing panel supports. As is seen best in Figures 2 and 3, the compressing panel 28 comprises a main plate 38 of width approximately equal to the distance between the side walls, and a plurality of strengthening ribs 39 behind the main plate, a shield 40 being preferably secured over the exposed rear edges of ribs 39. A pair of oppositely disposed supporting shafts 41 extend inwardly from side walls 24 and the compressing panel is provided with bearing members 42 through which these shafts extend. The retaining panel 29 is provided with strengthening ribs 43 and is likewise pivotally mounted in the tail gate by a pair of supporting shafts 44 mounted in side walls 24. The arrangement is preferably such that when the compressing panel is swung about its pivotal support, the lower lip 45 of the panel will sweep along the arcuate surface of hopper 26. The retaining panel on the other hand is of relatively shorter dimensions, although it likewise extends between side walls 24. The length of the retaining panel is such that when, as shown in Figure 6, this panel is swung forwardly, the lower edge thereof will be adjacent the surface of the hopper, thereby retaining refuse which has been forced forwardly thereof. When the retaining panel is swung rearwardly, it will engage the upper surface of the compressing panel, as shown in Figure 7, so that compressing movement of the compressing panel will cause the lower edge of the retaining panel to slide downwardly across its face.

*Compressing panel linkage*

Figures 3, 4, 5:
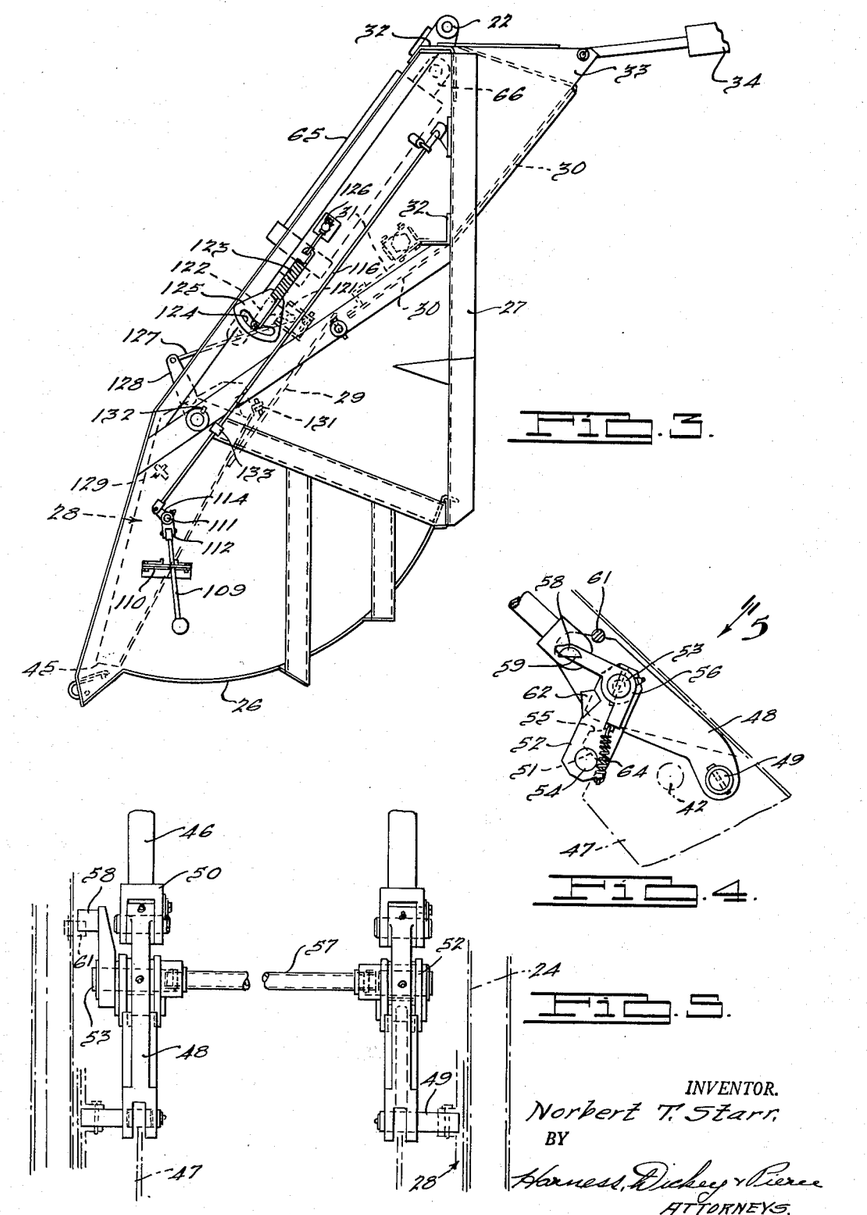
Figure 3 is a side elevational view taken from the side opposite that of Figure 1, and showing the control linkage.
Figure 4 is a fragmentary detail view of the compressing panel actuating linkage, the panel being actuated toward its compressing position.
Figure 5 is a fragmentary view taken in the direction of the arrow 5 of Figure 4, and showing the cross rod between the left and right linkages.

The actuating linkage for the compressing panel is shown best in Figures 4 and 5, and comprises in general a pair of hydraulically actuated elements 46, such as piston rods, which are connected in an articulated manner to two oppositely disposed ears 47 of the compressing panel by means of elongated links 48. The forked lower end of each link 48 is pivotally connected to its corresponding ear 47 by means of a pivot pin 49 which extends from the side of the compressing panel to ear 47. The upper end of each link is connected by pivot pin to the clevis 50 of the piston 46. It will be seen from an examination of the figures that the position of link pivot 49 relative to panel pivot 42 is such that, if these parts are taken alone, the mechanical advantage of the linkage steadily decreases after the compressing panel reaches its closed position (as it enters the hopper) since the line of force from piston rod 46 is diagonally downwardly toward the hopper entrance. Furthermore, it will be observed that when the compressing panel is being moved toward its compressing position, relatively greater leverage is desired than when the panel is being retracted, since the resistance of the compressed load increases as the hopper moves in.

This changing of actuating leverage is accomplished automatically by providing a radial shoulder 51 at the outer end of each ear 47 of the compressing panel, this shoulder being engaged by the linkage when the panel is moved toward its compressing position, and released when the panel is being retracted so that the actuating point returns to pivot 49. It will be observed that the radial distance of each shoulder 51 from panel pivot 42 is substantially greater than the distance of pivot 49 from pivot 42. The engagement of each shoulder 51 is accomplished by means of a pawl 52 which is of U shape, the legs of the pawl being secured to a pivot pin 53 extending through an intermediate portion of link 48. The toe 54 of the pawl is adapted to ride over the sloping rear face 55 of ear 47 and drop into underlying engagement with shoulder 51 when the compressing panel is moved toward its compressing position, as seen best in Figures 6 and 7.

Figures 8, 9:
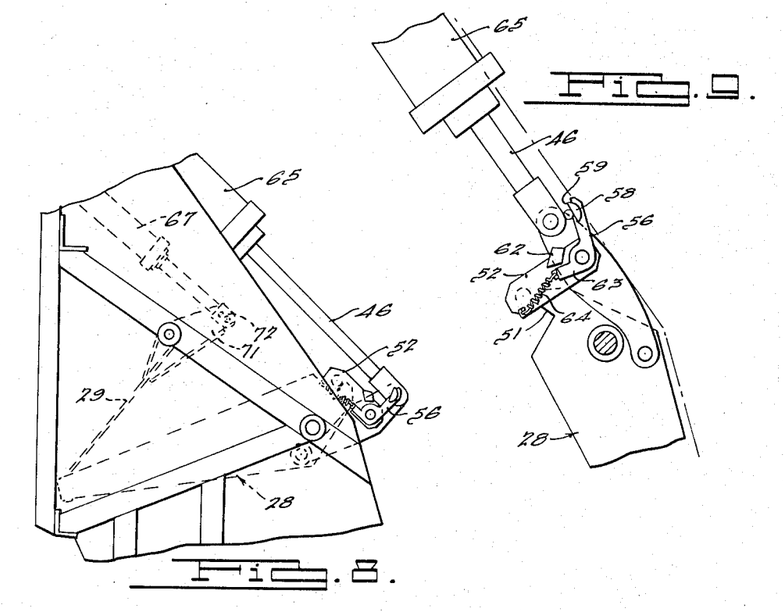
Figure 8 is a view similar to Figures 6 and 7 but showing the compressing panel in its compressing position.
Figure 9 is a fragmentary detail view of the compressing panel linkage with the compressing panel being retracted.

To remove the pawl from engagement with the shoulder when the compressing panel is retracted, a bell crank 56 is pivoted on one of the pivot pins 53, and a cross rod 57 connects the two pivot pins thereby transmitting the movement of the adjacent pawl 52 to the opposite pawl. The bell crank 56 is provided with a cam 58 extending laterally therefrom, this cam having an inclined lower cam face 59 engageable with a stationary abutment 61 extending inwardly from the adjacent side wall 24. The relative positions of these elements are such that when the compressing panel is being moved toward its compressing position, the cam 58 will move under and clear abutment 61, as shown in Figure 4. However, when the compressing panel is being retracted, as shown in Figure 9, the cam surface 59 of cam 58 will engage abutment 61, pivoting the bell crank 56 clockwise as seen in Figure 9. The adjacent pawl 52 is provided with a lateral stop 62 which, when the bell crank is pivoted clockwise in the manner described, will be moved by the leg 63 of the bell crank, thus forcing both pawls out of engagement with shoulders 51 of the compressing panel. As the cam 58 rides over abutment 61 it will be released to allow the bell crank 56 to move back to its original position. A spring 64 is connected between the end of bell crank arm 63 and the outer end of pawl 52, and the return movement of the bell crank will move the pawls back to their original position, ready to engage shoulders 51 upon the next compressing movement.

*Hydraulic system*

As stated previously, the actuating means for the compressing panel may comprise a pair of oppositely disposed piston rods 46, and in the preferred embodiment these piston rods move within a pair of cylinders 65 which are pivotally supported at their upper ends 66 by the tail gate. The retaining panel is also provided with a locking and retracting cylinder 67 which is centrally located and is pivotally supported at its upper end 68 by the tail gate. The piston rod 69 of cylinder 67 is pivotally connected to an upward extension 71 of retaining panel 29 by a lost-motion or slotted connection 72, the arrangement being such that retraction of the piston will cause retracting or rearward movement of the retaining panel. The slotted connection allows slight retraction of the retaining panel when the compressing panel is retracted, thus relieving some of the pressure in the compressed refuse. Since, as indicated above, the cylinder 67 serves as both a locking and actuating means for the retaining panel, its function can best be pointed out by a description of the hydraulic system for the entire assembly, and this description will also bring out the functions of compressing cylinders 65.

Figure 10:
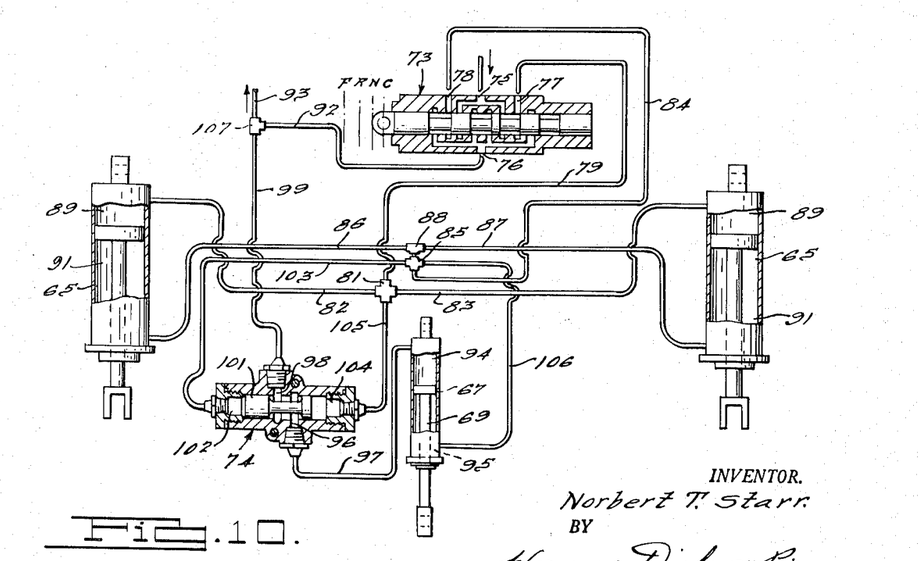
Figure 10 is a diagram of a preferred hydraulic system for the power actuating means.

The hydraulic system is shown in Figure 10, it being understood that the arrangement disclosed is merely illustrative of others which could be used. The system is controlled by a four way main valve 73 and the action of the retainer panel cylinder 67 is controlled by an auxiliary valve 74. The valve 73 is movable between four positions, all of which are marked in Figure 10 and are shown in detail in Figures 11 to 14. These positions may be indicated as a float position F, a compressing position C, a retracting position R, and a neutral position N.

It may be stated generally, before describing the hydraulic system in detail, that an object of this system is to provide means for the non-powered movement of the compressing panel 28 from its retracted position as shown in Figure 6 to its closed position as shown in Figure 7. This is accomplished by setting the valve in float position F so that the two chambers of each main cylinder have communication with each other as well as with the pump and tank. Upon reaching the closed position it is desired to drive the compressing panel toward its compressing position, shown in Figure 8, and this is accomplished with the valve in the compressing position C. When the compressing position has been reached the compressing panel is to be retracted by power means, the main valve for this purpose being moved to retracting position R. As is indicated below, automatic cycling means may be provided for shifting valve from position C to position R. Upon reaching its fully retracted position, it is desirable to lock the compressing panel against further movement, and for this purpose the valve is automatically moved to neutral position N, blocking flow to or from the compressing cylinder chambers.

During this cyclic movement of the compressing panel, the retaining panel is also controlled hydraulically in the following manner: During the compressing panel movement from retracted to closed position, the retaining panel is hydrostatically locked in its retaining position as shown in Figure 6. When the compressing panel reaches closed position, the retaining panel is retracted until its lower edge rests against the upper portion of the compressing panel as shown in Figure 7. The retaining panel is then allowed free movement, and is swung forwardly by the compressing panel during movement of the latter to compressing position. Upon reaching this position, and when the compressing panel starts its retracting movement, the retaining panel is again locked in its retaining position, as shown in Figure 8, and remains in this position all during the retracting movement of the compressing panel, and until this panel again reaches closed position on the next cycle.

With this description of the objects of the hydraulic system, its structural characteristics may be understood more readily. The valve 73 comprises a pump connection 75 and a tank connection 76, and also contains additional ports 77 and 78 leading to the cylinders 65. The connection from port 77 to the cylinders comprises a conduit 79 leading to a cross connection 81, from which branches 82 and 83 lead to the respective cylinders 65. Port 78 has conduit 84 leading therefrom to a cross connection 85, branches 86 and 87 leading therefrom to the respective cylinders 65 by means of an additional T connection 88. It will be seen that with the valve in position C the pump port 75 will be connected to port 77, thus applying fluid under pressure to upper or compressing chambers 89, and that port 78 will be connected to tank port 76, thus allowing fluid from lower chambers 91 to flow through conduit 92 to the tank line 93. On the other hand, with the valve in position R the pump will be connected to the lower or retracting chambers 91 and the tank to upper chambers 89, retracting the pistons. With the valve in float position F, the chambers 89 and 91 will be connected to each other and to the pump and tank ports, and the compressing panel will float down slowly by gravity from its retracted position, the frictional resistance in the conduits and connections imparting a dashpot action to this movement. Lastly, when the valve is in neutral position N, both ports 77 and 78 are blocked, and the pump port 75 is connected directly to tank port 76, so that the fluid is locked in the respective chambers 89 and 91.

As stated previously the retaining panel cylinder 67 is subjected to changes in its hydraulic connections which are coordinated with those of main cylinders 65. It may be said in general that cylinder 67 is subjected to two hydraulic conditions, one in which the fluid within upper chamber 94 is locked to hold the piston rod 69 in extended position, and another in which a pressure differential exists between the chambers tending to retract the piston rod. The first condition obtains all during the retracting movement of the compressing panel and also during its floating movement to closed position, and the second condition obtains when the compressing panel is moved toward its compressing position.

Auxiliary valve 74, which controls the retaining panel cylinder 67, is preferably of the spool type and has a port 96 connected to upper chamber 94 of the retaining panel cylinder by conduit 97. The valve further has a port 98 connected to tank line 93 by conduit 99. The movement of spool 101 is controlled by two end chambers, one chamber 102 being connected to cross connection 85 by conduit 103, and the other end chamber 104 being connected to cross connection 81 by means of conduit 105. The lower chamber 95 of cylinder 67 is also connected to cross connection 85 by means of a conduit 106.

It will be seen that when the spool 101 is in its leftward position as shown in Figure 10 the upper chamber 94 of cylinder 67 will be vented to tank, but when the spool is moved to the right this upper chamber is blocked. As indicated above, the venting of chamber 94 is desired during the compressing movement of compressing panel 28, and the locking of this chamber is desired during the retracting and floating movements of the compressing panel. This is accomplished by the pressure differential which exists between cross connections 81 and 85. It will be seen that when valve 73 is in compressing position C the pressure at connection 81 will be substantially greater than that at connection 85, since the former is connected to the pump and the latter to the tank. This differential pressure will shift spool 101 to the left, as seen in Figure 10, venting upper chamber 94. On the other hand, when the valve is shifted from position C to position R the pressure differential reverses since connection 85 is now connected to the pump and connection 81 to the tank. This will shift spool 101 to the right, locking chamber 94 with the piston 69 in extended position. Thus the flow of fluid to and from cylinder 67 is controlled automatically by the action of main cylinder 73 and the instantaneous locking of the retaining panel in its retaining position is assured when the compressing panel begins to retract. It will be observed that this hydrostatic locking will occur even when the compressing panel is retracted before it reaches the end of its stroke, so that if the refuse is too closely compressed to complete the stroke, the retaining panel will nevertheless hold the refuse in its most closely compressed position.

When the upper chamber 94 is vented upon movement of valve 73 to position C, it is obvious that in order to have retracting movement of piston 69 there must exist a pressure differential between chambers 94 and 95. This is accomplished in the preferred embodiment by the connection of chamber 95 to cross connection 85 by means of conduit 106. This produces a pressure differential between chambers 94 and 95 which is a reflection of the pressure differential existing between cross connection 85 and T connection 107 at the juncture of conduit 99 and tank line 93. Since when the valve 73 is in position C the lower chambers 91 of cylinders 65 are vented to tank line 93, this will result in a noticeable pressure drop between cross connection 85 and T connection 107, due to the frictional resistance in conduit 84, valve 73, and conduit 92. In practice this pressure drop has been observed to consist, for example, in a drop from two hundred pounds at cross connection 85 to one hundred pounds at T connection 107. Thus a substantial pressure differential will exist between chambers 95 and 94, urging the piston rod 69 into retracted position. It has been found desirable in some cases to assist the retracting action of cylinder 67 by auxiliary means, and for this purpose a tension spring 108 may be provided between the retaining panel and the tail gate, as shown in Figure 2.

*Control linkage*

As indicated previously, controls for the illustrated hydraulic system are manually actuated, and preferably also include means for automatic shifting of the valve 73 from compressing to retracting position and from retracting to neutral position. It is also an object of the control linkage system to obviate the danger of the compressing panel being powered to its closed position and thus injuring an operator who may be filling the hopper with refuse. Furthermore, it is desired that the control means, once moved into compressing position, be held in such position without the need for an operator, so that the operator is free for other duties. Should refuse collect between the rear of the retaining panel and the forward surface of the compressing panel, the danger of pushing the retaining panel beyond its normal limits should also be prevented by means for automatically stopping the compressing movement. It is also desirable that, once the compressing panel reaches its fully retracted position, the hydraulic system be automatically set into neutral position, ready for another cycle.

Figure 1:
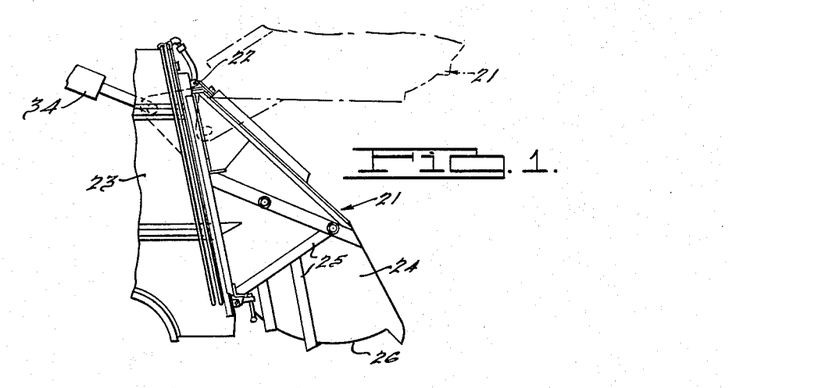
Figure 1 is a side elevational view of the refuse compressor mounted on the rear portion of a dump vehicle, showing the contour of the hopper.
Figure 2:
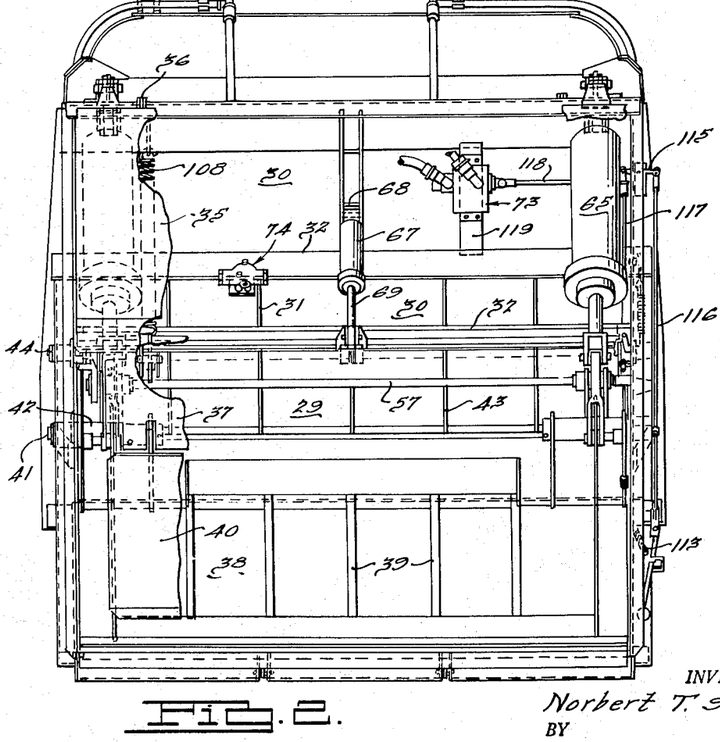
Figure 2 is a rear elevational view of the mechanism with parts broken away for clarity, and showing the panel actuating mechanism.

These objects are achieved in the preferred control linkage system, which is shown best in Figures 2 and 3, and is shown schematically in its progressive positions in Figures 11 to 14. The system is controlled primarily by a hand lever 109 which is mounted on the right side wall 24 of the tail gate. This handle extends through a guide bracket 110 having four positions, which are shown best in Figures 11 through 14 and will be described in detail later. For this purpose, the handle is pivotally supported at 111 for forward and rearward movement, and has a further pivotal connection 112 allowing sideways movement, the handle being urged inwardly by spring 113. A crank arm 114 extending from pivot 111 is connected to a rocking lever 115 at the upper portion of the tail gate by an elongated link 116. The rocking lever 115 is mounted for pivotal movement in a plane transverse to the side walls 24, and has one arm extending within the tail gate to which is pivotally connected a cycling link 117, and another arm connected to valve 73 by valve link 118. For this purpose valve 73 may be mounted by a bracket 119 to cross piece 32, as shown in Figure 2. Link 117 extends diagonally downwardly and rearwardly inside end wall 24 and has mounted at its rear end a channel-shaped lost-motion member 121, this lost-motion member being movable in a plane parallel to that of side wall 24. A bell crank 122 is pivotally mounted on side wall 24 adjacent the lost-motion member 121 and has one arm thereof extending into the space between the flanges of this member. The other arm of bell crank 122 is connected to one end of a toggle spring 123 mounted outside the side wall, this spring being connected to the bell crank through an arcuate slot 124 in the side wall which may be reinforced in this area by a fixed quadrant shaped plate 125. The toggle spring tends to urge bell crank 122 either clockwise or counterclockwise so that the bell crank arm is urged toward either one flange or the other of lost-motion member 121. The opposite end of toggle spring 123 is fixed to the side wall by a bracket 126.

Figures 13, 14:
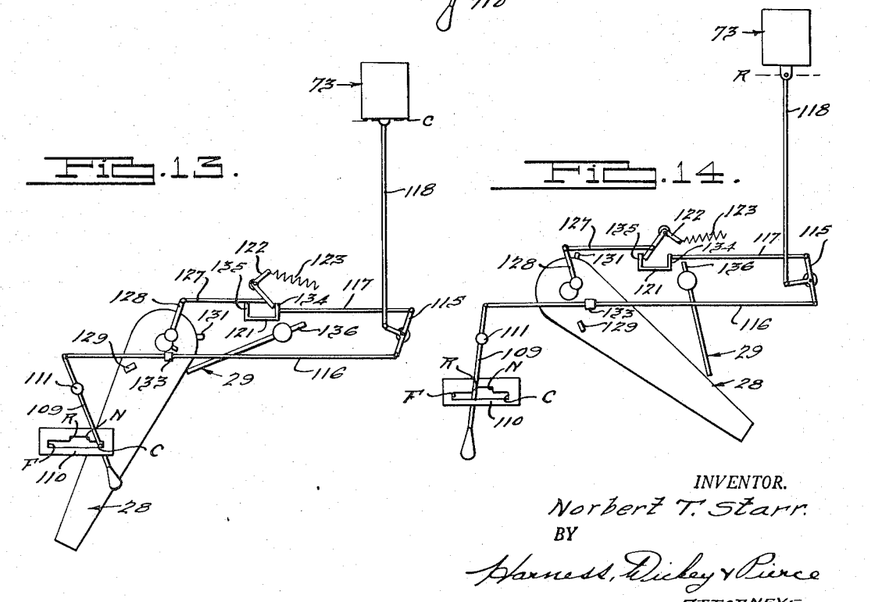

A cycling link 127 is pivotally connected at one end to the bell crank 122 and at its opposite end to the free end of a rocking arm 128 which is pivotally mounted inside the side wall adjacent the pivotal support for the compressing panel. This arm 128 is engageable by two projections 129 and 131 which are rigidly secured to the frame of the compressing panel. Projection 129 is in such radial position that when the compressing panel reaches its fully retracted position it will engage arm 128, throwing bell crank 122 counterclockwise. On the other hand, projection 131 is so arranged as to engage the opposite side of arm 128 when the compressing panel reaches its compressing position, rotating bell crank 122 clockwise as seen in Figure 14. The outer end of compressing panel pivot support 42 adjacent link 116 is provided with a radial projection 132, and the link is provided with a stop 133 movable into the path of projection 132 during the closing movement of the compressing panel, for purposes described below.

The functions of these control linkage elements perhaps may be brought out best by a description of their coaction during the sequential operation of the unit. For this purpose it may be stated first that the guide plate 110 has four positions: neutral position N, float position F, compressing position C, and retracting position R. The positions F, R, N and C on guide plate 110 correspond to these positions in valve 73, that is, upon positioning the hand lever in any one of these positions, valve 73 will always be set at the corresponding position. Positions F and C are at the extremities of the slot through which hand lever 109 extends, position C being at the forward end of this slot and position F at the rear end. Positions R and N are located at intermediate shoulders in the slot, position N being at a forward intermediate shoulder and position R at the rear shoulder. It will be observed that spring 113 continually urges lever 109 toward the side of the slot having these shoulders, so that if the lever is rocked about its pivot 111 from the F position or R position it will terminate its movement at position N unless held away from this position by the operator. Likewise, when moving from position C the lever will normally terminate its movement at position R.

Figures 11, 12:
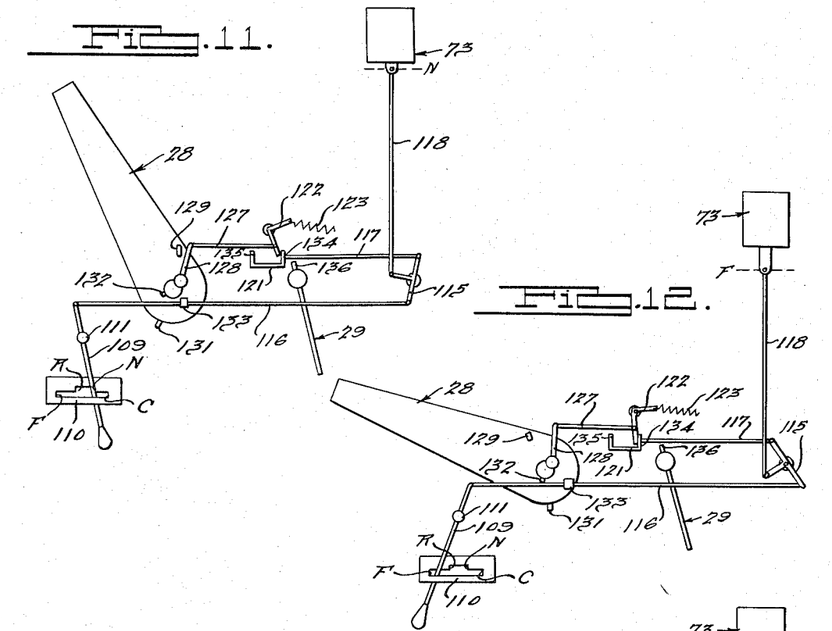
Figures 11, 12, 13 and 14 are schematic views of the control linkage for the assembly, the linkage being shown in its positions when the compressing panel is in its retracted, partially closed, closed and compressing positions respectively.

In operation, starting from an initial condition as shown in Figure 11, with the compressing panel 28 in fully retracted position and the lever 109 in position N, the parts will be as shown, bell crank 122 being in engagement with the forward flange 134 of lost-motion member 121. The parts will be held in this position by toggle spring 123 and it will be seen therefore that valve 73 will be held in position N, preventing downward movement of the compressing panel. Upon movement of the hand lever 109 from position N to position F shown in Figure 12, bell crank 122 will be rocked but not sufficiently to throw the toggle spring 123 over center. Valve 73 will be moved to position F, allowing the compressing panel to descend slowly. It will be observed that when in position F stop 133 is out of the path of movement of projection 132, but if the hand lever is prematurely moved from position F to position C projection 132 will engage stop 133 as the compressing panel descends, throwing the valve back to position N and stopping the descent of the compressing panel. This safety feature of the control linkage prevents the danger of injury to the operator through powered closing of the panel. When the compressing panel has reached its fully closed position as shown in Figure 13 the hand lever may be moved to position C, in which position it will be held by toggle spring 123. The compressing panel then will be powered to its compressing position as shown in Figure 14. When it reaches this position projection 131 will engage arm 128, rocking bell crank 122 counterclockwise so that toggle spring 123 forces this bell crank against the rear flange 135 of lost-motion member 121. This will move valve 73 and hand lever 109 to position R, so that the compressing panel will be driven automatically toward its retracted position. Upon movement of the compressing panel to its fully retracted position, projection 129 will engage arm 128 to reverse the position of the bell crank toggle and move the valve and hand lever from position R to position N, readying the mechanism for another cycle.

It should be noted that the lost-motion member 121 plays an important role in this operation. With this member, it is possible to shift from N to F positions and still allow the toggle spring 123 to later hold the hand lever in position C, freeing the operator for other duties. Furthermore, this lost motion connection allows the toggle spring action to throw the valve from position C to position R, and later from position R to position N, these movements being of progressively decreasing length.

Should refuse collect between the retaining panel and the compressing panel, the latter would normally be forced beyond its limit of movement, causing possible damage to the equipment. This is prevented by providing a projection 136 on the upper edge of retaining panel 29 in alignment with the forward flange 134 of lost-motion member 121. The engagement of projection 136 with flange 134 when the retaining panel is forced beyond its normal limit will cause valve 73 to move from position C to position N, thereby stopping the movement.

Operation

It is believed that the co-functioning of the ram linkage arrangement, the hydraulic system and the control linkage for this system is readily apparent from the above descriptions of the operations of each of these systems. In order to more completely comprehend this relationship a brief description of the operation of the entire unit is advisable. Starting from an initial condition in which the compressing panel 28 is fully retracted, the retaining panel 29 will be locked by valve 74 in its retaining position as shown in Figure 6, and the hand lever 109 will be in position N, valve 73 locking the compressing panel against movement. Upon movement of the hand lever to position F, the valve 73 will be moved to a float position, allowing the compressing panel to descend slowly retarded by the frictional resistance of the fluid in the hydraulic system. During this time the retaining panel 29 will remain locked. Should the handle 109 inadvertently be moved to position C before the ram reaches its closed position, projection 132 will return the valve to neutral. During this closing movement the piston rods 46 will be connected to the compressing panel through links 48 and pivots 49. As the ram reaches its closed position, pawls 52 will engage under shoulders 51 of the compressing panel, increasing the mechanical advantage of the pistons.

The hand lever is then moved to position C, upon which valve 73 supplies fluid under pressure to the upper chambers of cylinders 65, and due to the shift of valve 74 the retaining panel is retracted by cylinder 67 and spring 108 until it engages the compressing panel. The hand lever will be held in position C by toggle spring 123; however, should the retaining panel be forced too far, the projection 136 thereof will throw the valve to position N. Upon reaching its full compressing position, the compressing panel projection 131 will trip bell crank 122, throwing the valve 73 to retracting position R. This will send fluid under pressure to the lower chambers of cylinder 65, retracting the compressing panel. At the same time, auxiliary valve 74 will be shifted to hydrostatically lock the retaining panel in its retaining position. Should the compressing panel be retracted by manual shifting of hand lever 109 before its automatic trip, the retaining panel will be locked in whatever position it has attained, a slight retracting movement being permitted by slotted connection 72 to allow for the resilience of the compressed refuse. As the compressing panel passes its closed position pawls 52 will be disengaged from shoulders 51 allowing rapid retraction through connections 49. Upon reaching its fully retracted position, the compressing panel projection 129 will throw bell crank 122 over center again, thus shifting valve 73 back to neutral position N in readiness for another cycle.

While it will be apaprent that the preferred embodiment of the invention herein disclosed is well claculated to fulfill the objects above stated, it will be appreciated that the invention is susceptible to modification, variation and change without departing from the proper scope or fair meaning of the subjoined claims.

What is claimed is:

1. In a device for loading and compressing material into a compartment, a panel pivotally mounted for reciprocating swinging movement from an intermediate position to a compressing position to compress material into the compartment, a retaining panel pivoted adjacent said compressing panel, said retaining panel being engaged and actuated by said compressing panel during each reciprocating compressing movement thereof, and means for moving said compressing panel from said intermediate position into a retracted position, said compressing panel when in its retracted position allowing clear access for loading of said device.

2. In a device for loading material into a compartment, a hopper, a compressing panel mounted adjacent said hopper for reciprocating movement, means for moving said compressing panel into its compressing position and into a retracted position, said compressing panel when in its retracted position being clear of said hopper to allow said hopper to be loaded, and a retaining panel mounted for reciprocating movement adjacent said compressing panel, said retaining panel being engaged and actuated by said compressing panel during each compressing movement thereof.

3. In a device for loading and compressing material into a compartment, a hopper, a compressing panel mounted for reciprocating swinging movement adjacent said hopper, means for moving said compressing panel into a position lifted away from said hopper to allow material to be loaded therein, said compressing panel being further movable from said lifted position to a position closing said hopper, and a retaining panel pivotally mounted adjacent said compressing panel, the compressing panel being movable by said means from said closed position to a compressing position, the retaining panel being engaged and actuated by said compressing panel during its compressing movement.

4. In a device for loading and compressing material into a compartment, a closure for the rear end of said compartment, said closure having an opening therein, a compressing panel for said opening swingably mounted on said closure, a hydraulic ram, a linkage between said ram and panel for moving the panel between a retracted position lifted away from said closure to allow material to be loaded therein, a closed position covering the opening of said closure, and a compressing position within said closure for compressing the material into said compartment, the arc of movement between said retracted and compressing positions being greater than 180 degrees, and a retaining panel swingably mounted adjacent said compressing panel, said retaining panel being engaged and actuated by said compressing panel during its movement from said closed position to said compressing position.

5. In a device for loading and compressing material into a compartment, a compressing panel pivotally mounted for reciprocating swinging movement to compress the material into the compartment, said compressing panel being movable from an intermediate position closing said compartment into a loading position to allow material to be placed in its path, said compressing panel being further movable from said intermediate position to a compressing position compressing said material into said compartment, a retaining panel pivoted adjacent said compressing panel, said retaining panel being engaged and actuated by said compressing panel during movement to its compressing position, and reciprocating power means having a crank connection to said compressing panel for moving the panel to said loading position or said compressing position, the crank arm of said connection being substantially greater when the compressing panel is moved toward its compressing position than when said panel is moved toward its loading position.

6. In a device for loading and compressing material into a compartment, a closure for one end of said compartment, an arcuate hopper at the lower portion of said closure, said closure having an opening therein above said hopper, a compressing panel pivotally mounted in said closure, means for moving said compressing panel between a retracted position uncovering said opening and a compressing position within said closure, the compressing panel sweeping across said arcuate hopper during said movement, and a retaining panel movably mounted adjacent said compressing panel, said retaining panel being engaged and actuated by said compressing panel during said movement.

7. The combination according to claim 6, further provided with means for locking said retaining panel in its actuated position during the return movement of said compressing panel from its compressing position to its retracted position.

8. In a device for loading and compressing material into a compartment, a compressing panel pivotally mounted for reciprocating swinging movement to compress the material into the compartment, said compressing panel being movable from an intermediate position closing said compartment into a loading position to allow material to be placed in its path, said compressing panel being further movable from said intermediate position to a compressing position compressing said material into said compartment, and reciprocating power means having a crank connection to said compressing panel for moving the panel to said loading position or said compressing position, the crank arm of said connection being substantially greater when the compressing panel is moved toward its compressing position than when said panel is moved toward its loading position.

9. In a device for loading and compressing material into a compartment, a compressing panel pivotally mounted adjacent said compartment and movable from an intermediate position closing said compartment to a retracted position opening said compartment, said compressing panel being further movable from said intermediate position in the opposite direction to a compressing position forcing material into said compartment, operating means for said compressing panel including an extensible and retractable actuating element, first connecting means between said actuating element and said compressing panel for moving the panel from said intermediate position to said retracted position, and second connecting means between said actuating element and said panel and operable when the panel is moved from said intermediate position to said compressing position, said second connecting means providing a substantially greater mechanical advantage for said actuating element than said first connecting means.

10. In a device for loading and compressing material into a compartment, a compressing panel pivotally mounted adjacent said compartment and movable from an intermediate position either to a retracted position or compressing position, an extensible and retractable actuating element for operating said compressing panel, a link connecting said actuating element and said panel, said link being pivoted to said panel at a point spaced from the mounting pivot of the panel, a pawl connected to said actuating element and engageable with a portion of said panel a greater radial distance from its pivotal mounting than said link pivot, and means for engaging said pawl with said panel when the panel is being moved from its retracted position to its compressing position.

11. The combination according to claim 10, further provided with means for disengaging said pawl from said panel when the panel is moved from its compressing position toward its retracted position, whereby said actuating element acts through said link pivot to retract said panel.

12. In a device for loading and compressing material into a compartment, a compressing panel pivotally mounted adjacent said compartment and movable from an intermediate position either to a loading position or a compressing position, an extensible and retractable actuating element for operating said compressing panel, a link connecting said actuating element and said panel, said link being pivoted to said panel at a point spaced from the mounting pivot of the panel, a pawl pivotally mounted on said link, a shoulder on said panel spaced from the panel pivot mounting a greater radial distance than said link pivot, and resilient means for urging said pawl into operative engagement with said shoulder when the panel is moved from its loading position toward its compressing position.

13. In a device for loading and compressing material into a compartment, a compressing panel pivotally movable from an intermediate position either to a loading position or to a compressing position, a pair of extensible and retractable actuating elements connected to opposite ends of said panel for moving the panel to and from said positions, a link connecting each of said actuating elements to said panel, each of said links being pivoted to the panel at a point radially spaced from the panel pivot mounting, a pawl mounted on each of said links, said pawls each being engageable with a portion of said panel spaced at a greater radial distance from the panel mounting pivot than are said link pivots, means on one of said links for disengaging its corresponding pawl from the panel when said panel is moved from its compressing position toward its loading position, and means for transmitting the action of said disengaging means to said other pawl.

14. The combination according to claim 13, said disengaging means comprising a member mounted on said one link for movement independent of said pawl, and means for camming said member against said pawl when said panel is moved from its compressing position toward its loading position, whereby said pawl is disengaged from said panel.

15. In a device for loading and compressing material into a compartment, a compressing panel pivotally mounted for reciprocating movement to compress the material into the compartment, a retaining panel pivoted adjacent said compressing panel, said retaining panel being engaged and actuated by said compressing panel during each reciprocating compressing movement thereof, power means for moving said compressing panel in its compressing direction, and locking means operable between locking and unlocking conditions, said locking means being actuated by said power means into its locking condition for holding said retaining panel against substantial movement when said compressing panel is moved in the opposite direction by said power means.

16. In a device for loading and compressing material into a compartment, a hopper, a compressing panel pivotally mounted adjacent said hopper, said compressing panel being movable in a compressing direction to force material from said hopper into said compartment, a retaining panel pivoted adjacent said compressing panel and engaged thereby when the compressing panel is moved in its compressing direction, power means for moving said compressing panel, locking means actuated by said power means for holding said retaining panel against substantial movement when the compressing panel is moved away from its compressing position, and means actuated by said power means for unlocking said locking means when said compressing panel is moved in its compressing direction.

17. In a device for loading and compressing material into a compartment, a hopper adjacent said compartment, a compressing panel movable from a position closing said hopper to a compressing position forcing the material from said hopper into said compartment, a retaining panel engaged and actuated by said compressing panel when moved toward its compressing position, power means for actuating said compressing panel, locking means for holding said retaining panel against movement when said compressing panel is moved from its compressing position, and means actuated by said power means for unlocking said locking means when said compressing panel is moved from its closed position toward its compressing position.

18. In a device for loading and compressing material into a compartment, a compressing panel pivotally mounted adjacent said compartment and movable to and from a compressing position, power means for moving said compressing panel, a retaining panel pivotally mounted adjacent said compressing panel, said retaining panel being engaged and actuated by said compressing panel when moved toward its compressing position, and combined locking and retracting means for said retaining panel, said means being actuated by said power means to retract said retaining panel when said compressing panel is moved toward its compressing position, said means being further actuated by said power means to lock said retaining panel against movement when said compressing panel is moved away from its compressing position.

19. In a device for loading and compressing material into a compartment, a compressing panel pivotally mounted adjacent said compartment, said panel being movable from a loading position to a position closing said compartment and thence to a compressing position, a retaining panel pivotally mounted adjacent said compressing panel, said retaining panel being movable between a retracted position against said compressing panel and a retaining position, power means for moving said compressing panel between its said positions, and retracting means actuated by said power means for moving said retaining panel into its retracted position when said compressing panel is moved from its closed position toward its compressing position.

20. In a device for loading and compressing material into a compartment, a compressing panel pivoted adjacent said compartment and movable in a compressing direction, a retaining panel pivoted adjacent said compressing panel and engaged by said compressing panel when the latter is moved in a compressing direction, hydraulic means for actuating said compressing panel, locking means for holding said retaining panel against movement when said compressing panel is moved in the opposite direction, said locking means comprising a piston and cylinder connected to said retaining panel, and means operated by said hydraulic means for blocking the movement of fluid to and from said cylinder.

21. In a device for loading and compressing material into a compartment, a compressing panel pivotally mounted adjacent said compartment and movable to and from a compressing position, a piston and cylinder for actuating said compressing panel, a retaining panel pivoted adjacent said compressing panel and movable between a retracted position against said compressing panel and a retaining position, a piston and cylinder for moving said retaining panel from its retaining position to its of said retaining panel cylinder to spaced points in the compressing position, and means connecting opposite ends conduit leading to one side of said compressing panel cylinder, whereby the pressure differential created between said spaced points will cause actuation of said retaining panel piston.

22. In a device for loading and compressing material into a compartment, a hopper adjacent said compartment, a compressing panel pivotally mounted adjacent said hopper, said panel having a normal intermediate position closing said hopper and being movable from said intermediate position in a compressing direction across said hopper or to a loading position away from said hopper, and hydraulic means for driving said panel from its intermediate position in said compressing direction or toward said loading position, said hydraulic means being settable to a float position for allowing said panel to descend from its loading position without power.

23. In a device for loading and compressing material into a compartment, a compressing panel pivotally mounted adjacent said compartment, said panel being movable from an intermediate position either in a compressing direction or to a loading position, hydraulic means for actuating said compressing panel from its intermediate position in either of said directions, control means for said hydraulic means having a compressing position for moving the panel in its compressing direction, a non-powered float position in said hydraulic means for allowing the panel to descend from said loading position toward said intermediate position by its own weight, and means for preventing the movement of said control means from said float position to said compressing position before said panel has reached its intermediate position.

24. In a device for loading and compressing materials into a compartment, a closure for said compartment, said closure having an opening therein, a compressing panel mounted adjacent said opening for pivotal movement from an intermediate position closing said opening to a compressing positions or to a loading position, hydraulic means for actuating said compressing panel from said intermediate position to said compressing position and from said compressing position to said loading position, said hydraulic means including a piston and cylinder, and control means for said hydraulic means settable to a position allowing flow of fluid from one side to the other of said cylinder, whereby said panel may descend from said loading position by its own weight.

25. In a device for loading and compressing materials into a compartment, a closure for said compartment, said closure having an opening therein, a compressing panel mounted adjacent said opening for pivotal movement from an intermediate position closing said opening to a compressing position or to a loading position, hydraulic means for actuating said compressing panel from said intermediate position to said compressing position and from said compressing position to said loading position, control means for said hydraulic means having a compressing position for moving said panel in a compressing direction and a retracting position for moving the panel toward its loading position, and means actuated by said panel when it reaches its compressing position for shifting said control means to retracting position.

26. The combination according to claim 25, said control means being further provided with a neutral position for locking said panel against movement, and means actuated by said panel when it reaches its loading position for shifting the control means into neutral position.

27. In a device for loading and compressing materials into a compartment, a compressing panel movable between a loading position away from said compartment, an intermediate position closing said compartment and a compressing position forcing material into said compartment, power means for moving said panel between said positions, control means for said power means having a neutral position and a float position, an over-center link, and a lost-motion connection between said over-center link and said control means, whereby said control means may be shifted from said neutral position to said float position without throwing said over-center link.

28. The combination according to claim 27, said control means being further provided with a compressing position, said over-center link being adapted to hold said control means in its compressing position.

29. In a device for loading and compressing materials into a compartment, a compressing panel pivotally mounted adjacent said compartment for reciprocating swinging movement to compress material therein, a retaining panel pivoted adjacent said compressing panel and movable to a retaining position, power means for actuating said compressing panel, a control linkage for said power means, said control linkage having a compressing position and a neutral position, and means actuated by movement of said retaining panel beyond its retaining position for shifting the control linkage from its compressing position to its neutral position.

30. In a device for loading and compressing materials into a compartment, a compressing panel pivotally mounted adjacent said compartment for reciprocating swinging movement to compress material therein, a retaining panel pivoted adjacent said compressing panel and movable to a retaining position, by the compressing panel when moved in a compressing direction, locking means for holding said retaining panel against substantial movement away from its retaining position, and a lost-motion connection between said retaining panel and said locking means, whereby the retaining panel is allowed slight retracting movement when the compressing panel is retracted.

31. In a device for loading and compressing material into a compartment, a hopper adjacent said compartment, a compressing panel pivotally mounted adjacent said hopper, said panel having a normal intermediate position closing said hopper and being movable from said intermediate position in a compressing direction across said hopper or to a loading position away from said hopper, actuating means for driving said panel from its intermediate position in said compressing direction or toward said loading position, and means for rendering said actuating means inoperative when said panel is moved from its loading position toward its intermediate position.

References Cited in the file of this patent

UNITED STATES PATENTS

| | | |
|---|---|---|
| 1,633,557 | Morgan | June 21, 1927 |
| 2,212,058 | Wood | Aug. 20, 1940 |
| 2,215,115 | Buffington | Sept. 17, 1940 |
| 2,323,366 | Barrett | July 6, 1943 |
| 2,371,540 | Mott | Mar. 13, 1945 |
| 2,430,973 | Boissonnault | Nov. 18, 1947 |
| 2,477,669 | Stephens | Aug. 2, 1949 |
| 2,561,608 | Boissonnault | July 24, 1951 |
| 2,603,374 | McNamara, Jr. | July 15, 1952 |
| 2,649,216 | Gollnick | Aug. 18, 1953 |
| 2,699,268 | Miller | Jan. 11, 1955 |

FOREIGN PATENTS

| | | |
|---|---|---|
| 797,517 | France | Feb. 17, 1936 |